J. M. MOREHEAD, G. E. COX & J. G. MARSHALL.
PROCESS OF SUBDIVIDING CRYSTALLINE CALCIUM CARBID.
APPLICATION FILED MAR. 30, 1905.
1,036,525.
Patented Aug. 20, 1912.
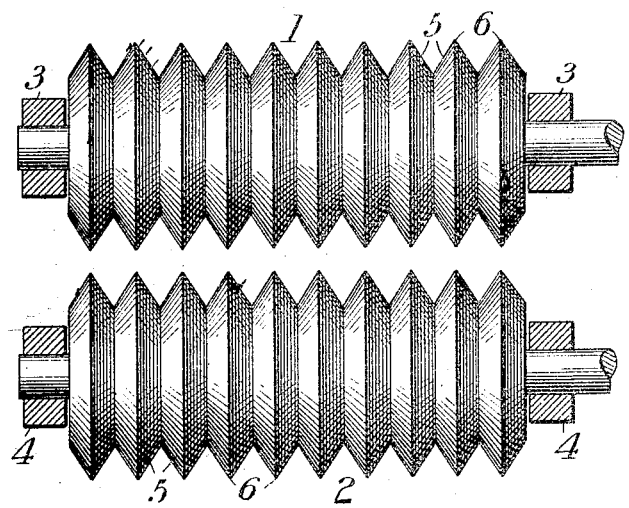
Witnesses:
R A Balderson
J. B. Hill
Inventors:
John M. Morehead,
George E. Cox,
James G. Marshall,
by Byrnes & Townsend,
Att'ys.

UNITED STATES PATENT OFFICE.

JOHN M. MOREHEAD, OF CHICAGO, ILLINOIS, AND GEORGE E. COX AND JAMES G. MARSHALL, OF NIAGARA FALLS, NEW YORK, ASSIGNORS TO UNION CARBIDE COMPANY, OF NEW YORK, N. Y., A CORPORATION OF VIRGINIA.

PROCESS OF SUBDIVIDING CRYSTALLINE CALCIUM CARBID.

1,036,525.  Specification of Letters Patent.  Patented Aug. 20, 1912.

Application filed March 30, 1905. Serial No. 252,977.

*To all whom it may concern:*

Be it known that we, (1) JOHN M. MOREHEAD and (2) (3) GEORGE E. COX and JAMES G. MARSHALL, citizens of the United States, residing at (1) Chicago, county of Cook, and State of Illinois, and (2) (3) Niagara Falls, county of Niagara, and State of New York, have invented certain new and useful Improvements in Processes of Subdividing Crystalline Calcium Carbid, of which the following is a specification.

The substance crystalline calcium carbid, claimed in U. S. Patent 541,138, granted June 18, 1895, to Thomas L. Wilson, is commercially produced in rotary electric furnaces of the general type shown in U. S. Patent 597,880, granted January 25, 1898, to William Smith Horry. The product is removed from these furnaces in the form of large ingots or blocks, which must be divided into fragments of fairly definite and uniform size in order to fit the carbid for use in acetylene-gas generators. It is customary to divide the ingots by breaking them into large pieces and passing the pieces through reciprocating or gyratory crushers. The product of the crushers is a mixture of fragments of different sizes and of dust. The dust, which constitutes a considerable percentage of the whole product, must be screened out, and is a material of little value, being resmelted in accordance with the process claimed in U. S. Patent 727,095, granted May 5, 1903, to George E. Cox.

The present invention is an improved process of subdividing crystalline calcium carbid into fragments of definite and predetermined size, with the production of little or no dust, in which advantage is taken of the fact that the carbid ingots, when freed from scale, consist of aggregated crystals of fairly definite size and shape, with well defined cleavage planes along which the material readily splits. In carrying out the process, the alined curved cutting edges of two sets of wedges are inserted into the carbid at spaced intervals and at points substantially lying in the cleavage planes of the crystals, and the wedges are gradually rotated on their axes of curvature and simultaneously forced into the carbid, thereby splitting apart the crystals or masses of crystals.

One form of apparatus which has been commercially employed to carry out the process is shown in the accompanying drawing, in which the figure is a plan view of spaced rolls each provided with a series of annular wedge-members.

The rolls 1, 2, preferably of steel or chilled iron, are axially journaled in bearings 3, 4. The rolls are grooved at spaced intervals to provide the annular wedge-members 5, having sharp edges 6. The edges of the adjacent wedge-members of the two rolls are arranged in alinement but preferably out of contact, the purpose being to gradually split rather than cut the carbid. The distance between the edges 6 of the successive members 5 of each roll should correspond roughly to the size of the fragments into which the carbid is to be divided, being nevertheless governed by the requirement that the edges shall enter the carbid at points substantially lying in the cleavage planes of the crystals.

In using the described apparatus, the carbid is first broken into large pieces and these are fed between the rolls, being thereby split into fragments of the desired size. For the production of the smaller sizes, it is preferred to employ successive pair of rolls having the wedge-members more closely spaced, thereby progressively effecting the subdivision.

We claim:—

1. The process of subdividing crystalline calcium carbid, which consists in gradually cleaving the same into fragments of predetermined size by applying a cleavage pressure thereto at opposite sides thereof and at points in the cleavage planes of the crystals.

2. The process of subdividing crystalline calcium carbid, which consists in continuously feeding the carbid, and subdividing the same into fragments of predetermined size by applying a cleavage force thereto at opposite sides thereof and at points in the cleavage planes of the crystals.

3. The process of subdividing crystalline calcium carbid, which consists in continuously feeding the carbid, and splitting the same into fragments of predetermined size by applying a continuously-increasing cleaving pressure at opposite sides of the carbid to split the same at points along the cleavage planes of the crystals.

In testimony whereof, we affix our signatures in presence of two witnesses.

JOHN M. MOREHEAD.
GEORGE E. COX.
JAMES G. MARSHALL.

Witnesses for John M. Morehead:
E. F. PRICE,
G. W. MEAD.

Witnesses for George E. Cox and James G. Marshall:
W. H. L. SNEATH,
L. E. BILLINGS.